No. 623,258. Patented Apr. 18, 1899.
F. P. ROSBACK.
MACHINE FOR STEP MITERING BOX BLANKS.
(Application filed Dec. 22, 1898.)
(No Model.) 14 Sheets—Sheet 1.

Witnesses:

Inventor:
Frederick P. Rosback,
By Dyrenforth and Dyrenforth,
Attys.

No. 623,258. Patented Apr. 18, 1899.
F. P. ROSBACK.
MACHINE FOR STEP MITERING BOX BLANKS.
(Application filed Dec. 22, 1898.)
(No Model.) 14 Sheets—Sheet 2.

Witnesses:
Inventor:
Frederick P. Rosback,
By Dyrenforth & Dyrenforth,
Attys.

No. 623,258.

F. P. ROSBACK.
MACHINE FOR STEP MITERING BOX BLANKS.
(Application filed Dec. 22, 1898.)

Patented Apr. 18, 1899.

(No Model.)

14 Sheets—Sheet 4.

Witnesses:

Inventor:
Frederick P. Rosback,
By Dyrenforth & Dyrenforth,
Attys.

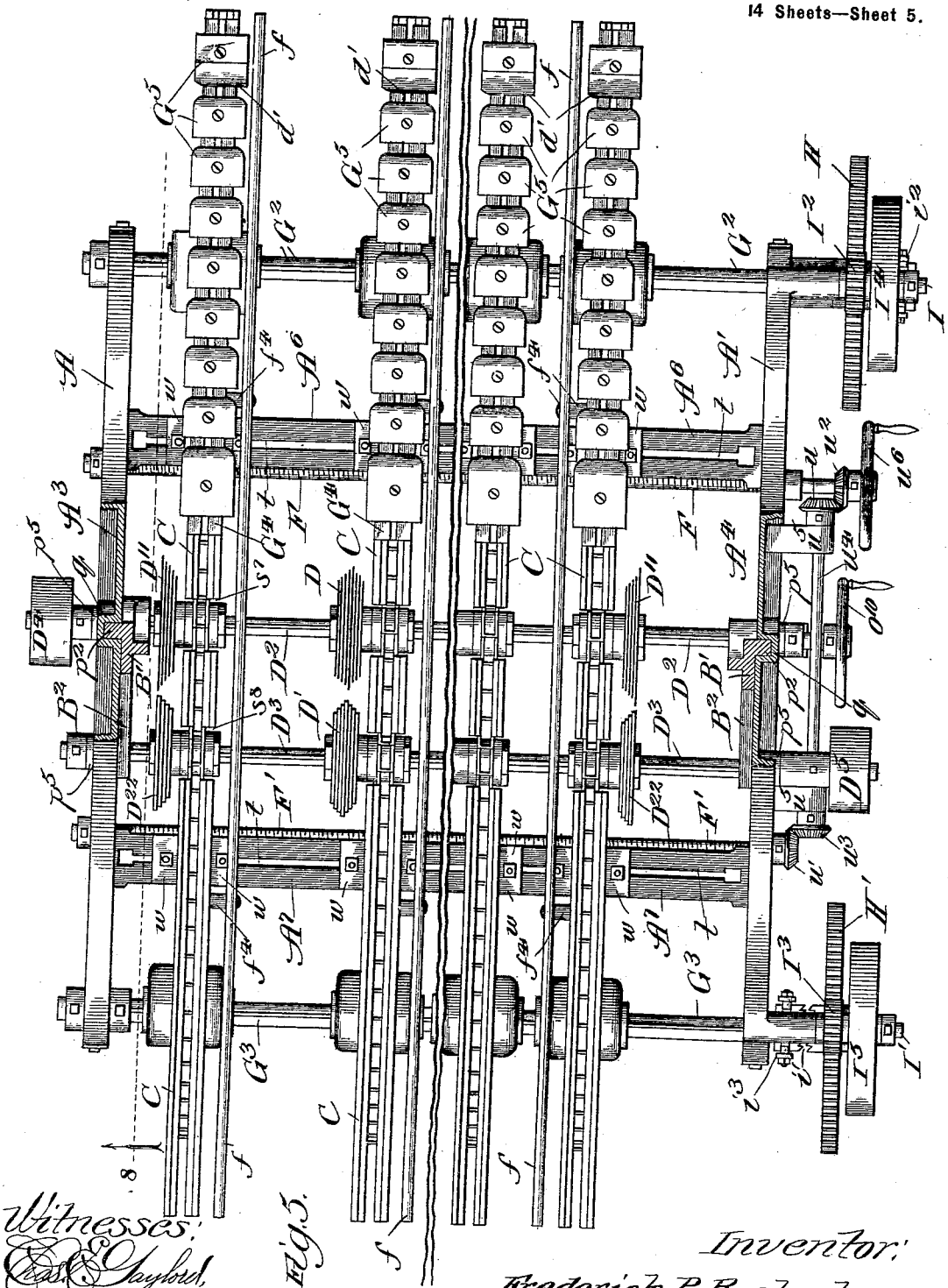

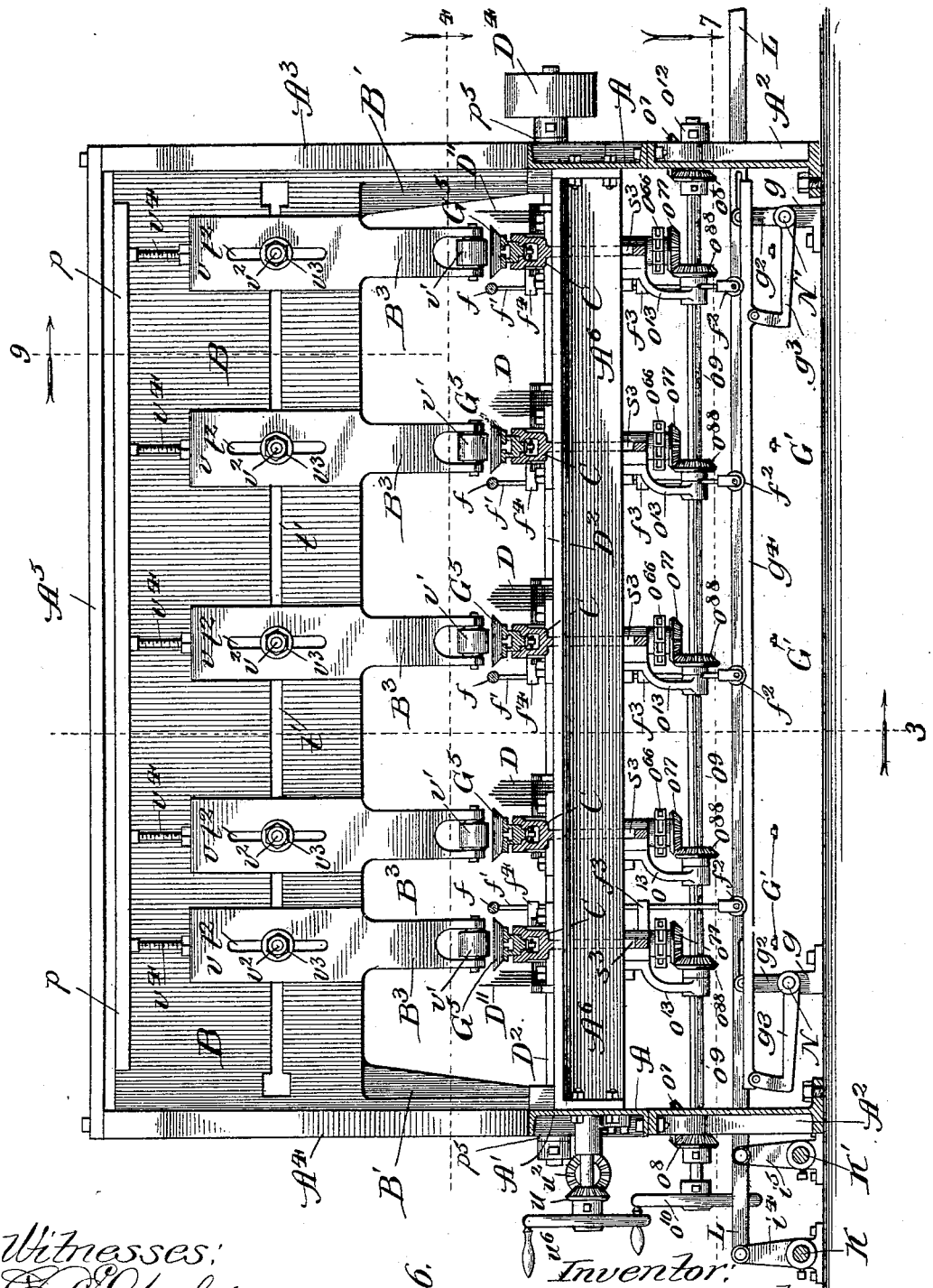

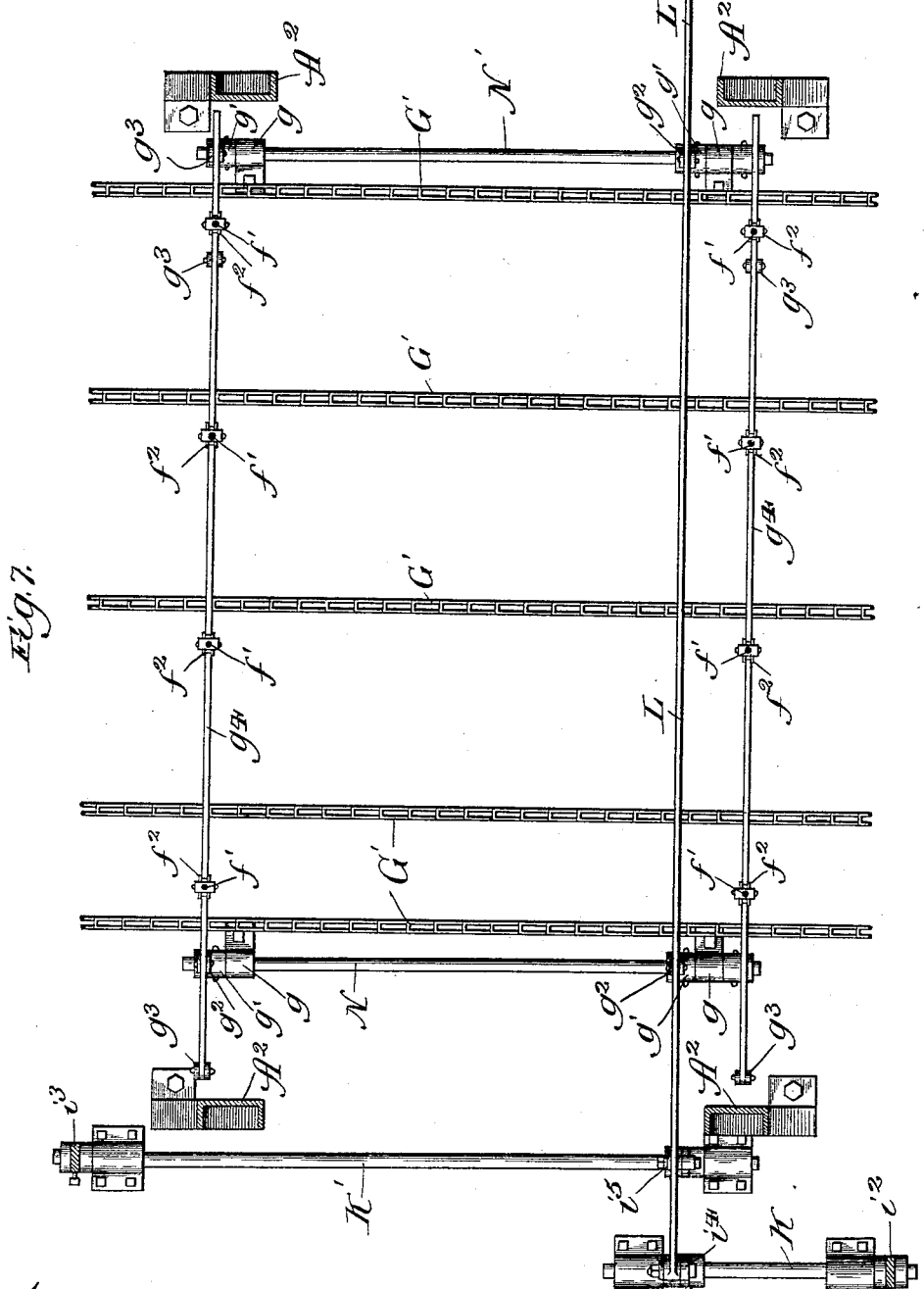

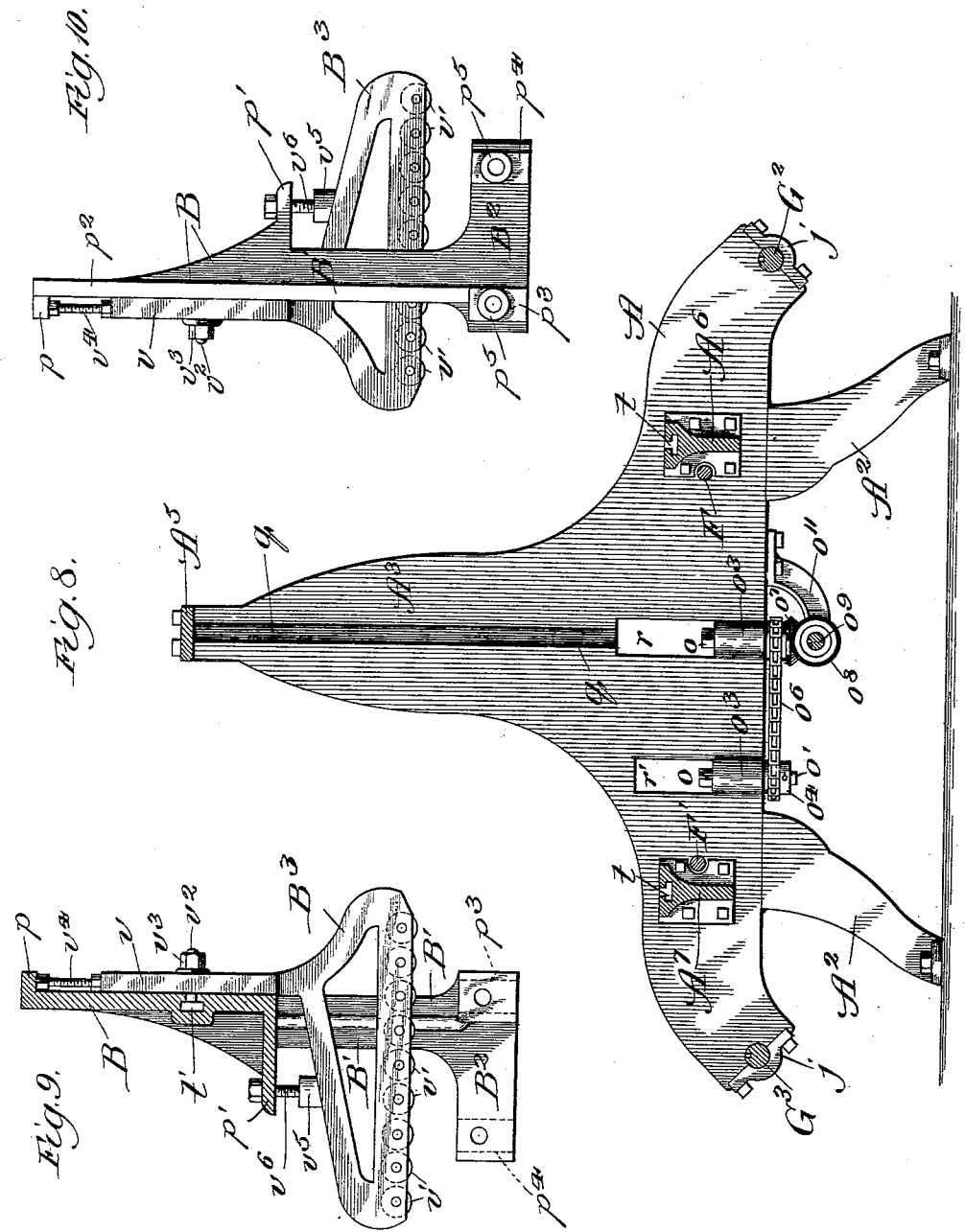

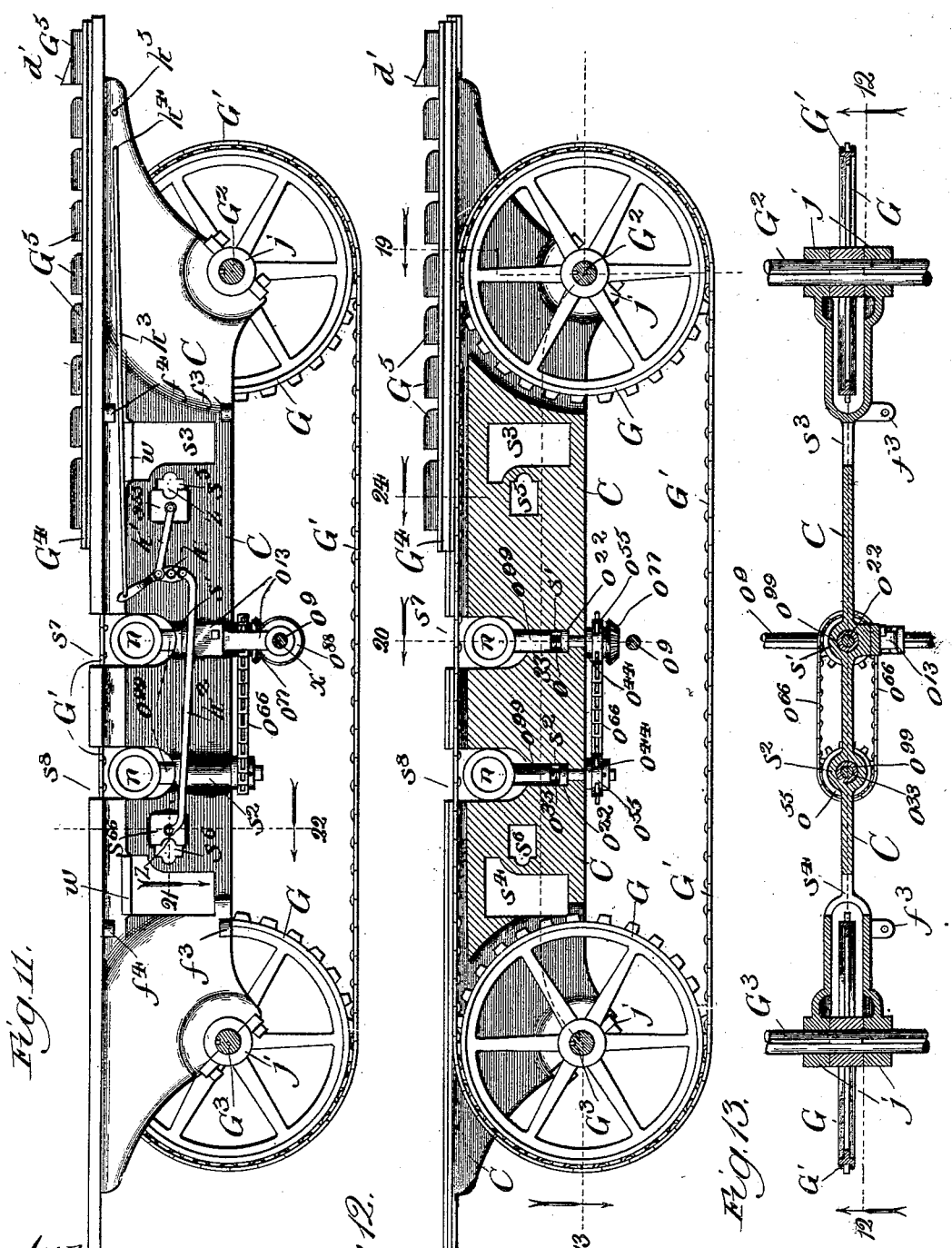

No. 623,258. Patented Apr. 18, 1899.
F. P. ROSBACK.
MACHINE FOR STEP MITERING BOX BLANKS.
(Application filed Dec. 22, 1898.)
(No Model.) 14 Sheets—Sheet 10.
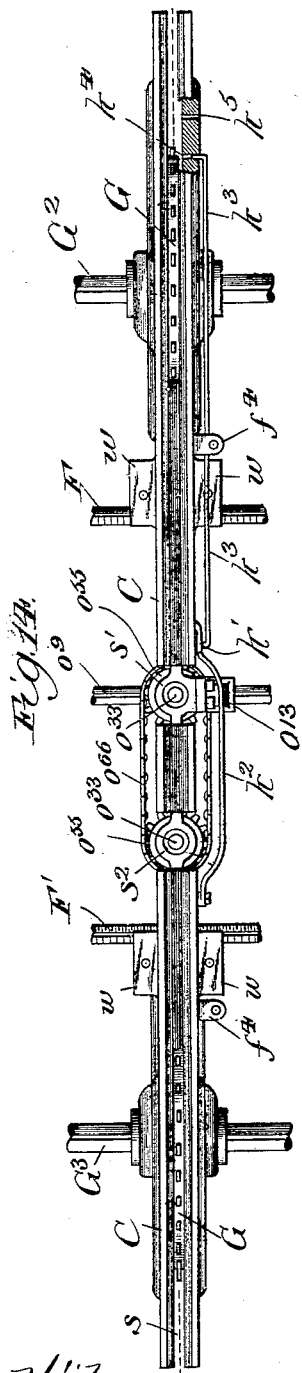
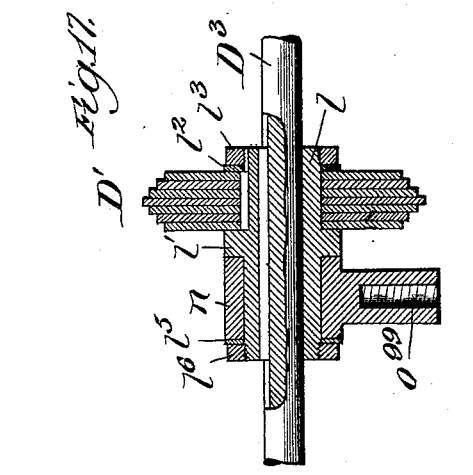
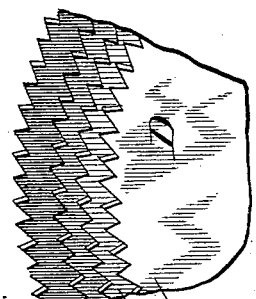
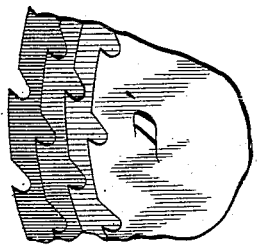
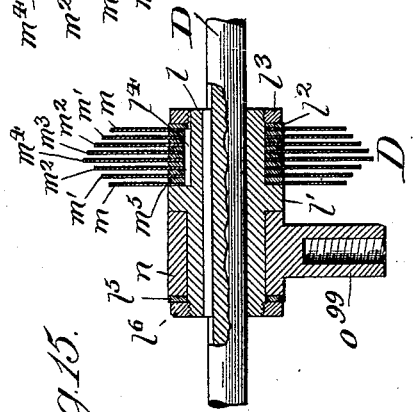
Witnesses:
Inventor:
Frederick P. Rosback,
By Dyrenforth & Dyrenforth,
Attys.
THE NORRIS PETERS CO., PHOTO-LITHO., WASHINGTON, D. C.

No. 623,258. Patented Apr. 18, 1899.
F. P. ROSBACK.
MACHINE FOR STEP MITERING BOX BLANKS.
(Application filed Dec. 22, 1898.)
(No Model.) 14 Sheets—Sheet 11.
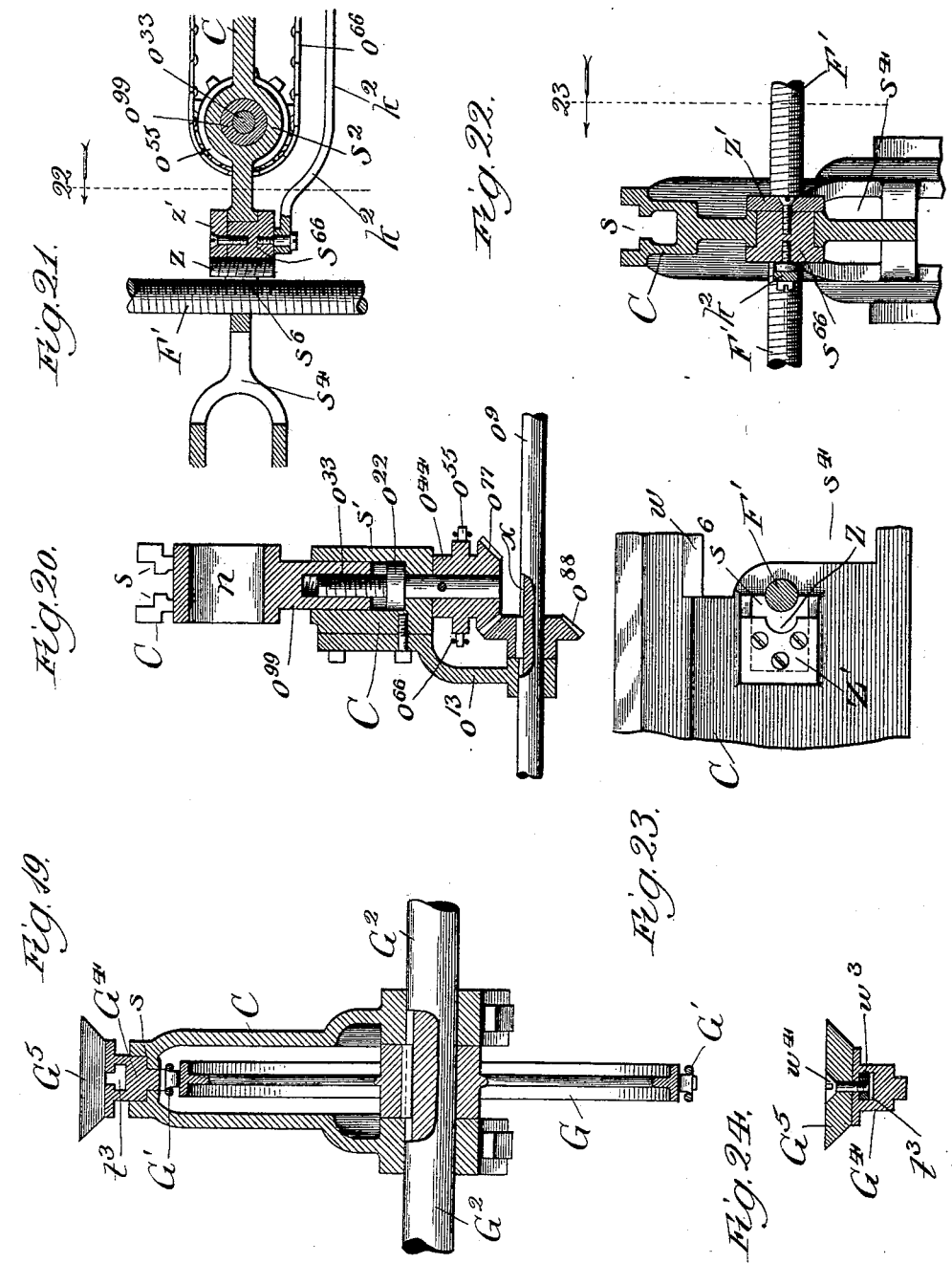
Witnesses:
Inventor:
Frederick P. Rosback,

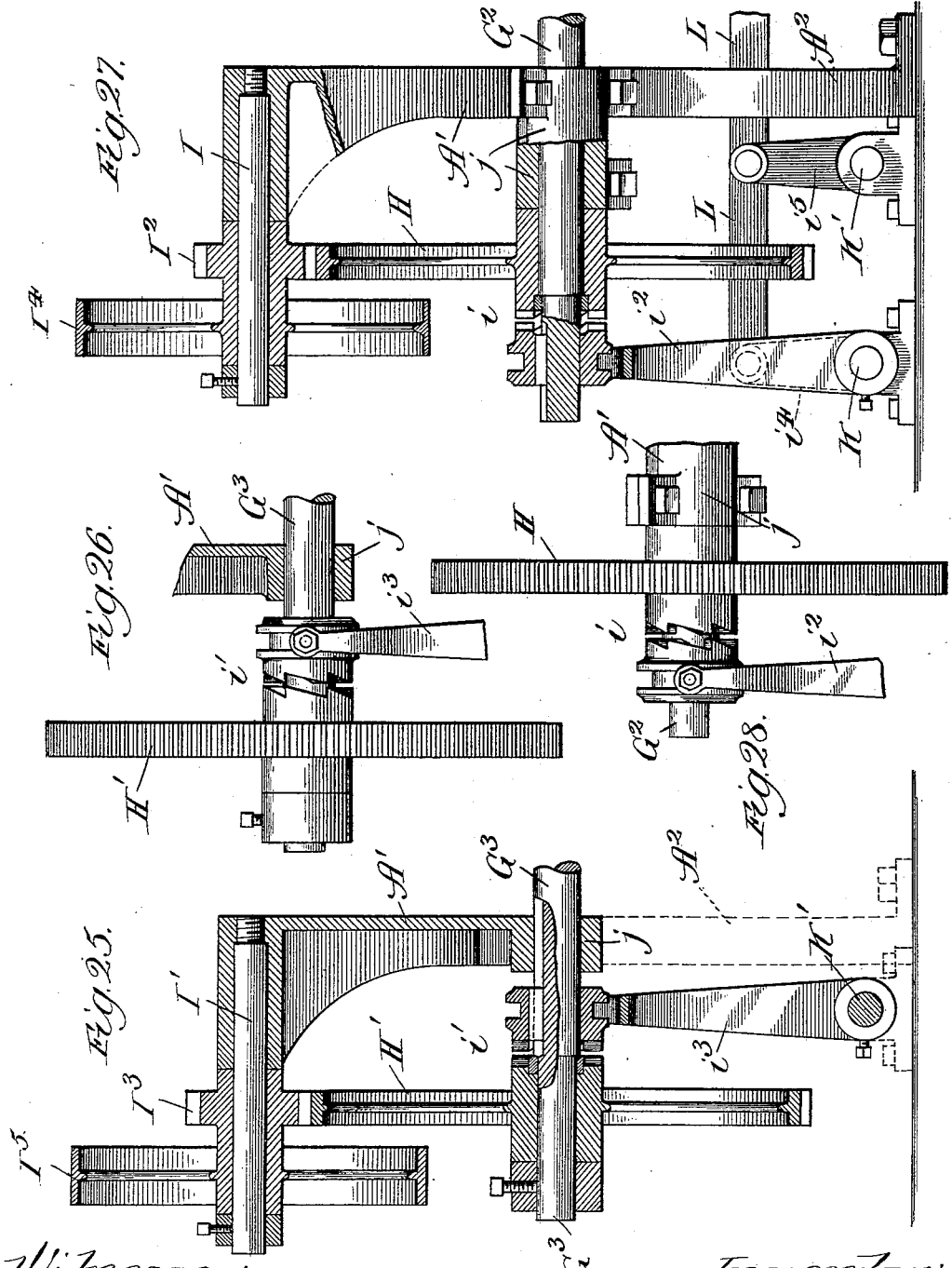

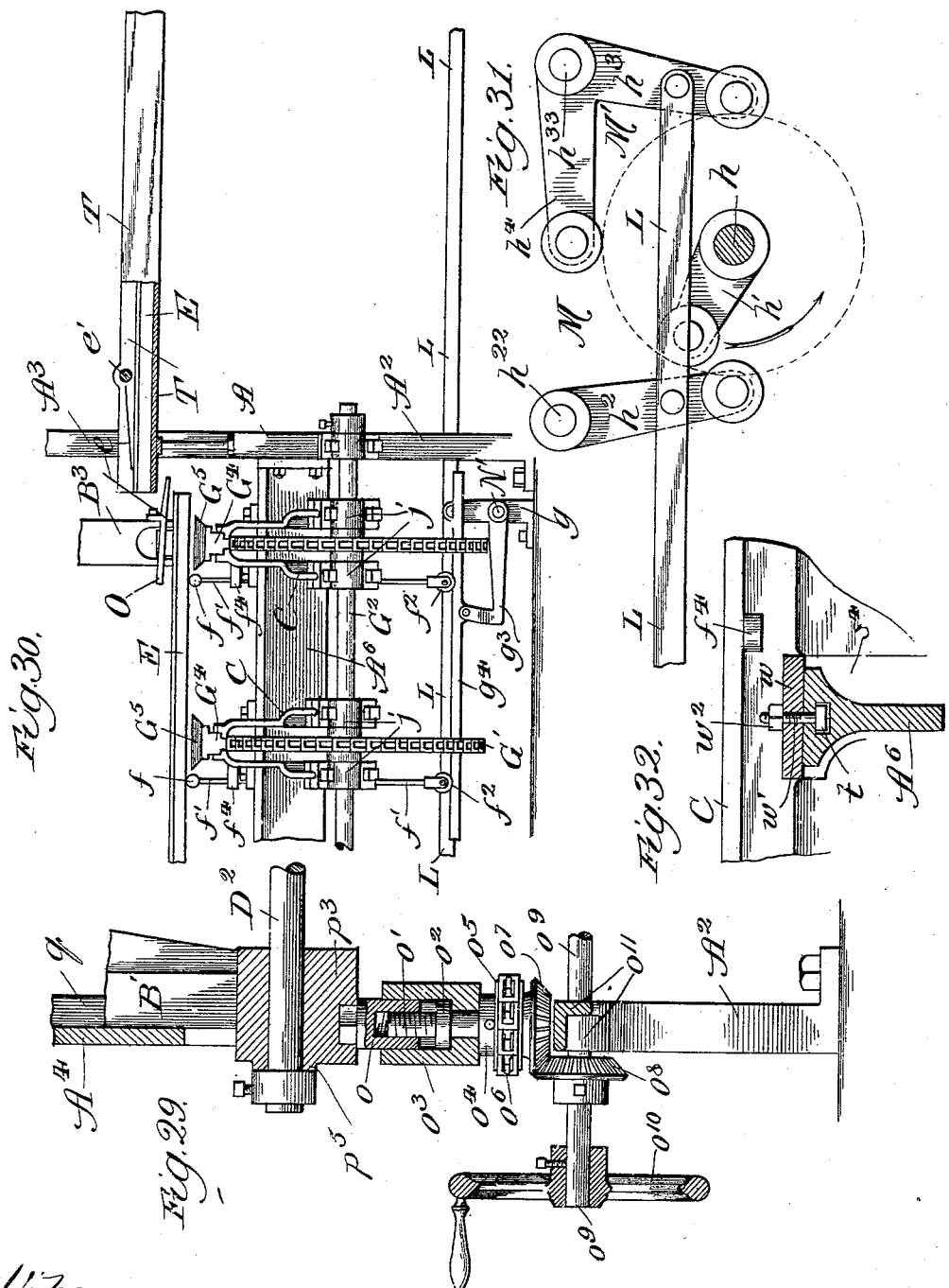

No. 623,258. Patented Apr. 18, 1899.
F. P. ROSBACK.
MACHINE FOR STEP MITERING BOX BLANKS.
(Application filed Dec. 22, 1898.)
(No Model.) 14 Sheets—Sheet 14.
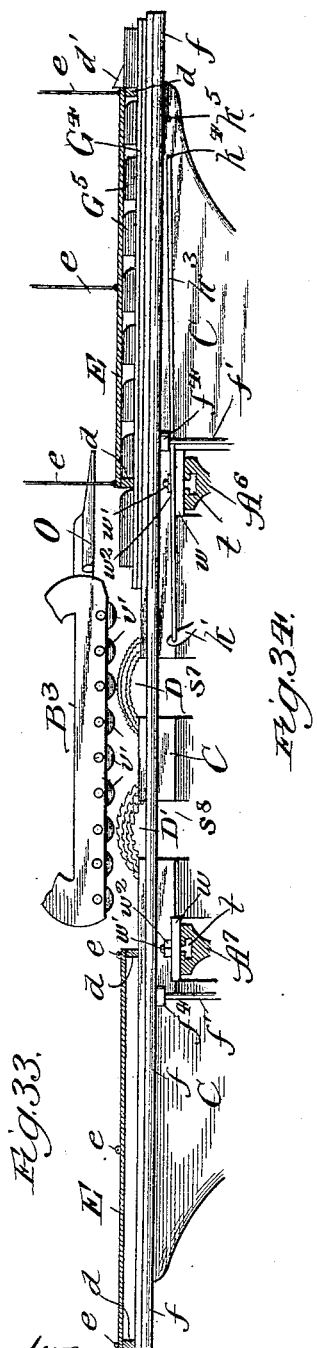
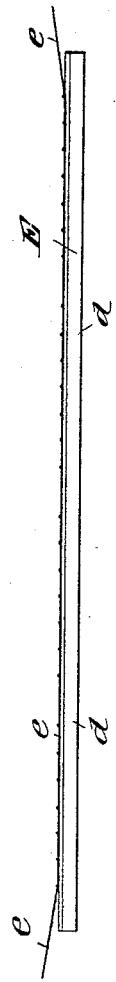
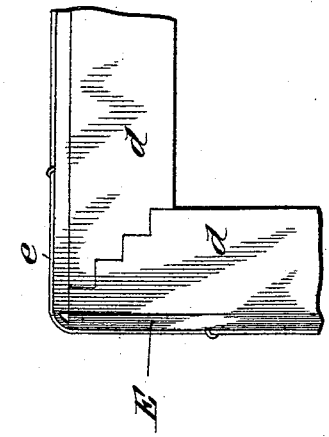
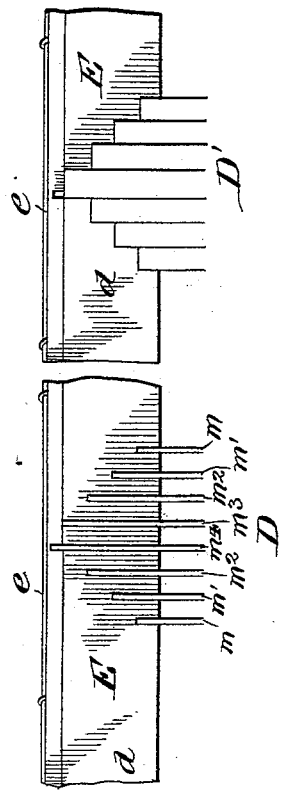
Witnesses:
Inventor:
Frederick P. Rosback,
By Dyrenforth & Dyrenforth,
Attys.

UNITED STATES PATENT OFFICE.

FREDERICK P. ROSBACK, OF CHICAGO, ILLINOIS, ASSIGNOR TO WILLIAM P. HEALY, OF SAME PLACE.

MACHINE FOR STEP-MITERING BOX-BLANKS.

SPECIFICATION forming part of Letters Patent No. 623,258, dated April 18, 1899.

Application filed December 22, 1898. Serial No. 700,019. (No model.)

*To all whom it may concern:*

Be it known that I, FREDERICK P. ROSBACK, a citizen of the United States, residing at Chicago, in the county of Cook and State of Illinois, have invented a new and useful Improvement in Machines for Step-Mitering Box-Blanks, of which the following is a specification.

Figure 4:
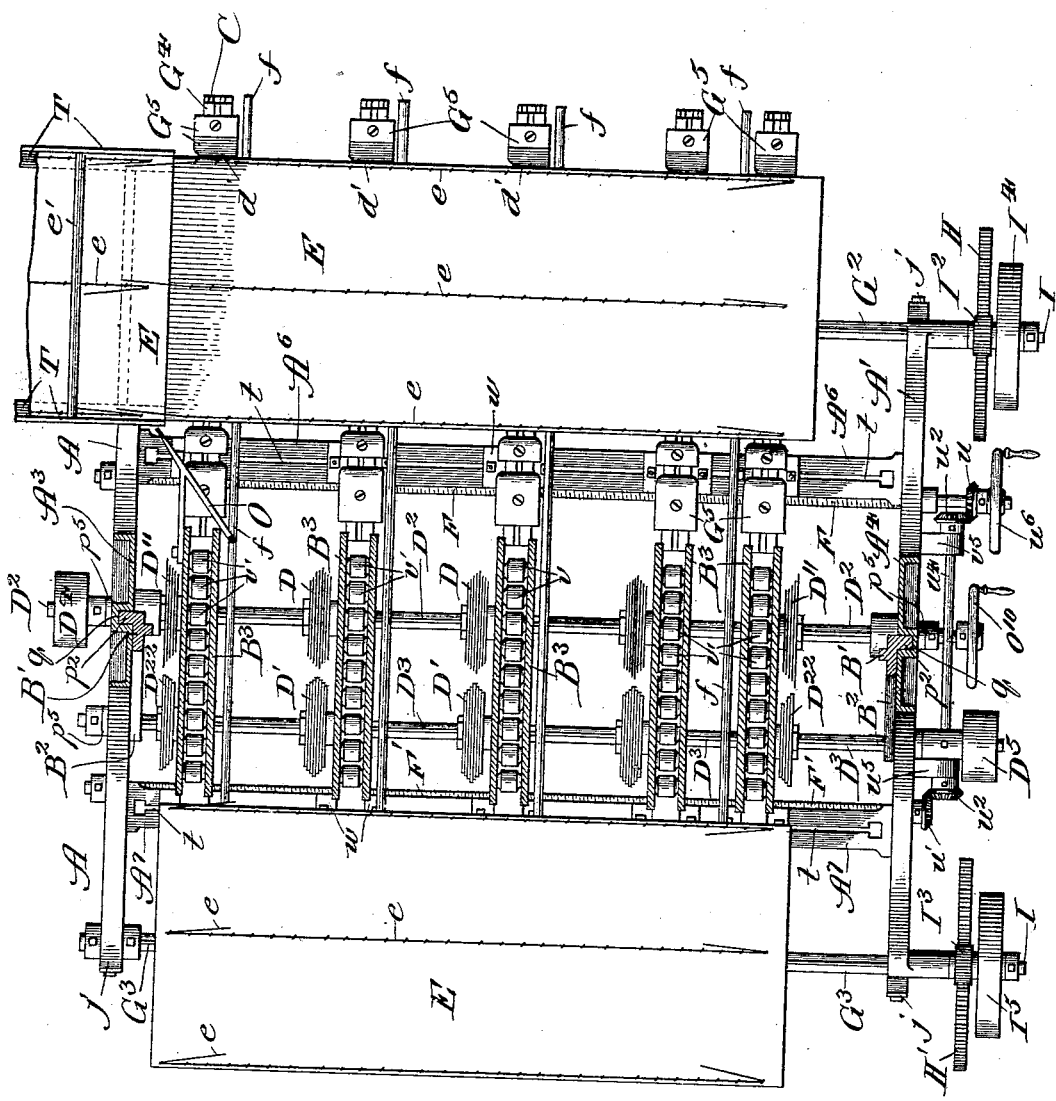

The invention relates to an improved machine for step-mitering box-blanks at suitable intervals to adapt them to be bent to form the corners of angular boxes with the opposite sections of each set of step-mitered cuts intermeshing. The box-blank, for step-mitering which more particularly the present machine is devised, comprises a thin sheet of wood reinforced on opposite sides, respectively, with parallel longitudinally-extending cleats and wires, the cleats, sheet, and wires being fastened together at intervals, as with staples driven through the sheet into the cleats and over the wires to straddle them. A top plan view of the blank is shown in Fig. 4 and an edge view in Fig. 34 of the drawings. The action of this machine is that of producing the step-mitered cuts in the cleats and under surface of the sheet of a blank fed to it and also to trim the blank to the proper length.

The present machine is an improvement on that forming the subject of my former patent, No. 609,630, dated August 23, 1898.

Figure 1:
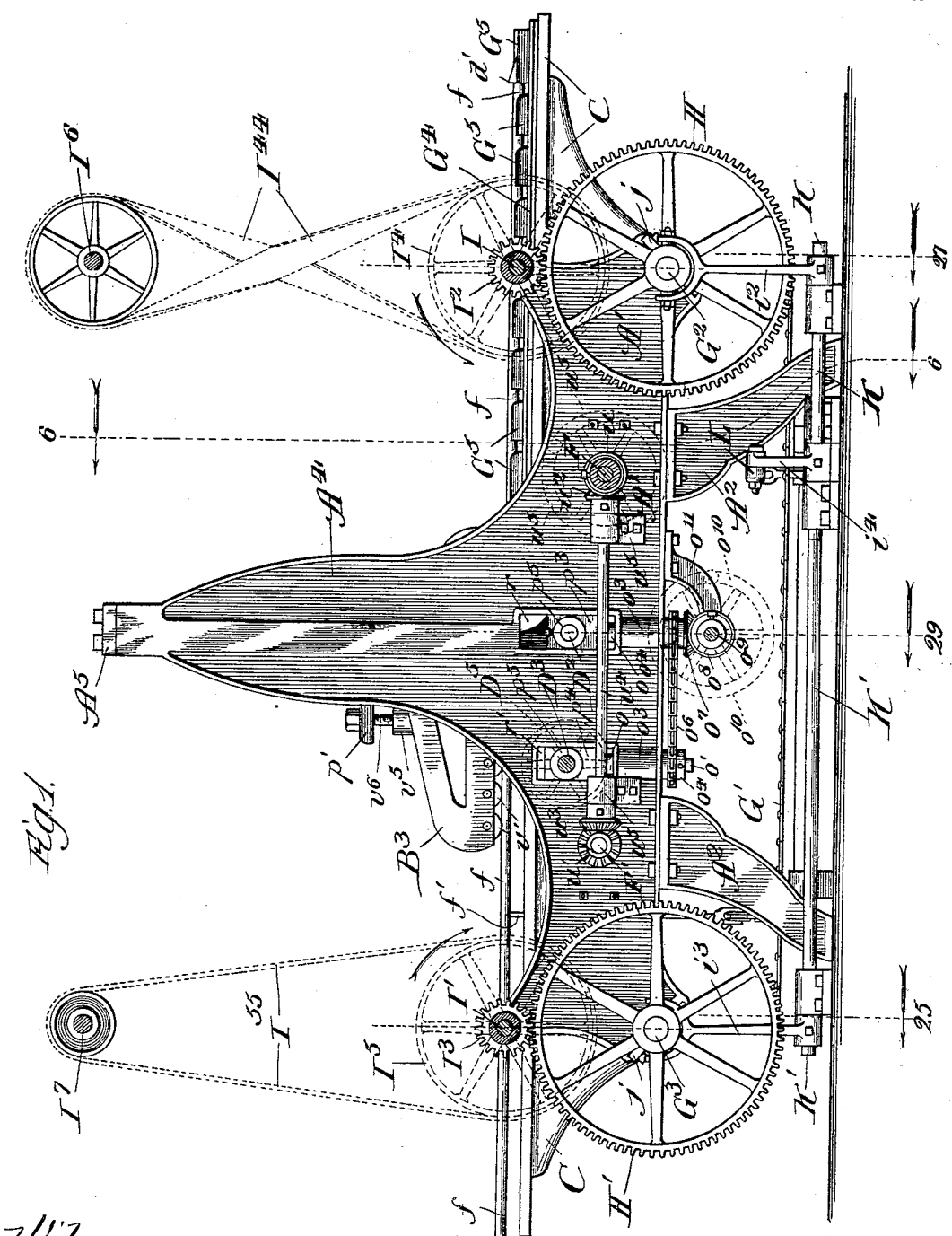
Figure 2:
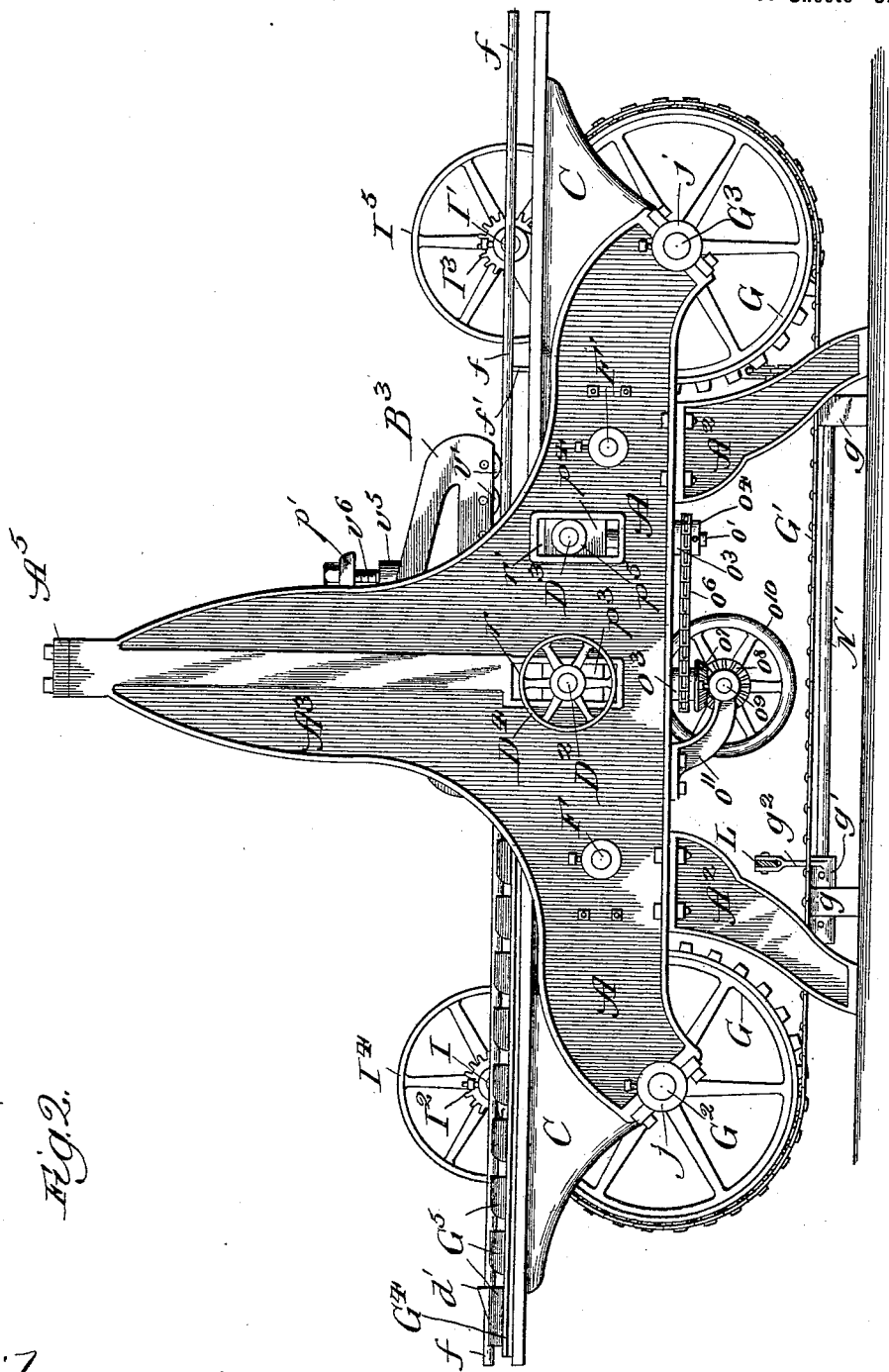
Figure 3:
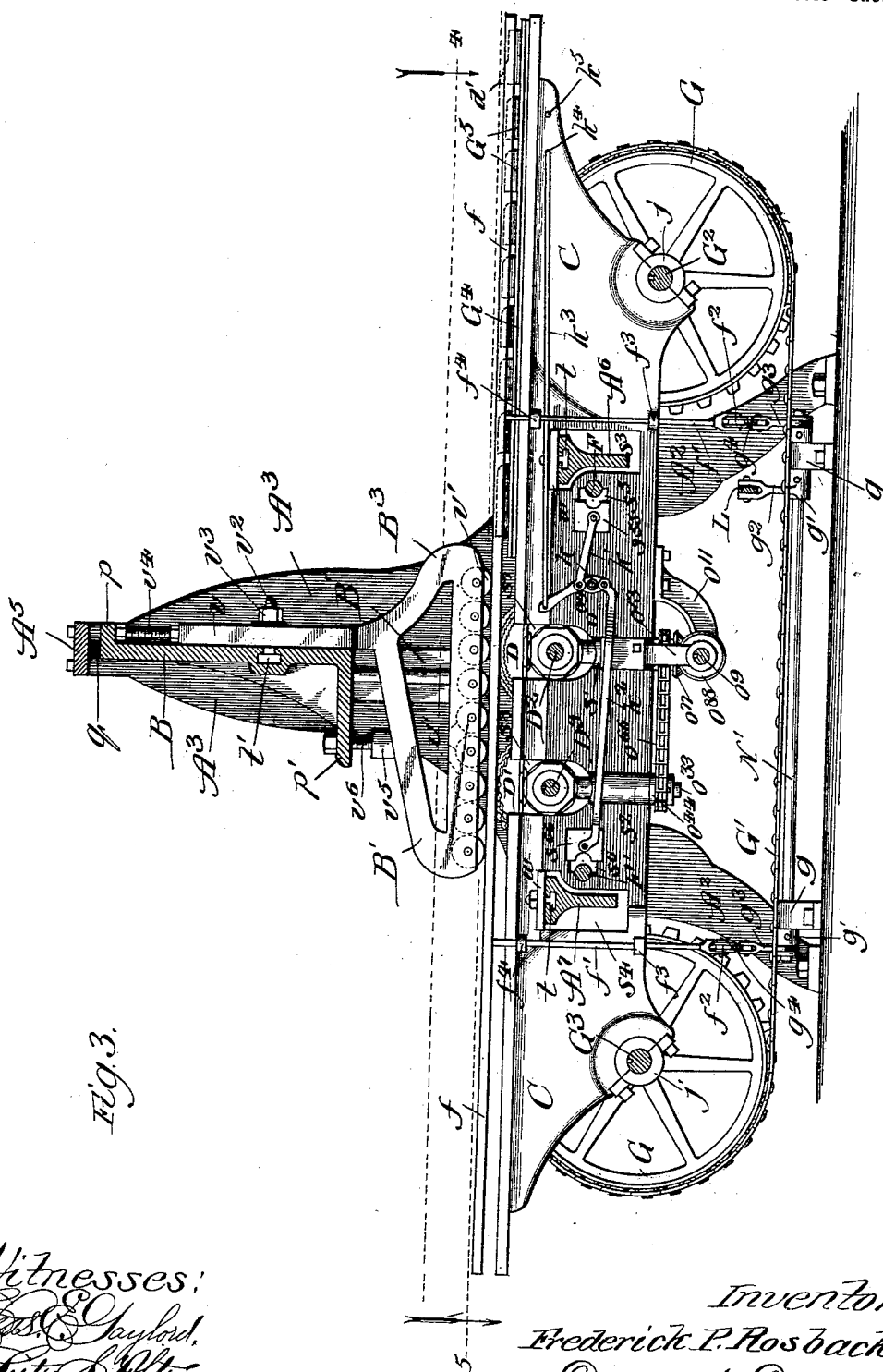

Referring to the accompanying drawings, Figure 1 is a view in elevation of the machine regarded from one side; Fig. 2, a similar view of the machine regarded from the opposite side; Fig. 3, a longitudinal section taken at the line 3 on Fig. 6 and viewed in the direction of the arrow; Fig. 4, a section taken at the line 4 on Fig. 3 or at the line 4 on Fig. 6 and viewed in the direction of the arrows; Fig. 5, a section taken at the line 5 on Fig. 3 and viewed in the direction of the arrow; Fig. 6, a section taken at the line 6 on Fig. 1 and viewed in the direction of the arrow; Fig. 7, a section taken at the line 7 on Fig. 6 and viewed in the direction of the arrow; Fig. 8, a section taken at the line 8 on Fig. 5 and viewed in the direction of the arrow; Fig. 9, a section taken at the line 9 on Fig. 6 and viewed in the direction of the arrow; Fig. 10, a view in elevation of the parts illustrated in Fig. 9, but regarded from the opposite side; Fig. 11, a view in side elevation of one of the several opposite end bifurcated bed-rails of the machine with the mechanism carried by it, but omitting the cross-girders and disk clusters and their shafts; Fig. 12, a section of the same, taken at the line 12 on Fig. 13 or at the line 12 on Fig. 14 and viewed as indicated by the arrows, but omitting the half-nuts for adjusting the bed-rail; Fig. 13, a section taken at the line 13 on Fig. 12 and viewed in the direction of the arrow; Fig. 14, a partly-broken top plan view of the mechanism illustrated in Fig. 11; Fig. 15, a broken view showing one of the cutting-saw clusters in position on their vertically-adjustable supporting-shaft; Fig. 16, a broken view, in side elevation, of one of the cutting-saw clusters; Fig. 17, a view like that presented by Fig. 15 of one of the chipping-disk clusters on their vertically-adjustable shaft; Fig. 18, a broken view, in side elevation, of a chipping-disk cluster; Fig. 19, a section taken at the line 19 on Fig. 12, viewed in the direction of the arrow and enlarged; Fig. 20, a section taken at the line 20 on Fig. 12, viewed in the direction of the arrow and enlarged; Fig. 21, a broken section taken at the line 21 on Fig. 11, viewed in the direction of the arrow and enlarged; Fig. 22, a section taken at the line 22 on Fig. 11 and enlarged or at the line 22 on Fig. 21 and viewed in the direction of the arrows; Fig. 23, a section taken at the line 23 on Fig. 22 and viewed in the direction of the arrow; Fig. 24, a section taken at the line 24 on Fig. 12, viewed in the direction of the arrow and enlarged; Fig. 25, a broken section taken at the line 25 on Fig. 1, viewed in the direction of the arrow and enlarged; Fig. 26, a broken view showing the carrier-feed clutch device in elevation; Fig. 27, a broken section taken at the line 27 on Fig. 1, viewed in the direction of the arrow and enlarged; Fig. 28, a view like that presented by Fig. 26 of the carrier-return clutch device; Fig. 29, a section taken at the line 29 on Fig. 1, viewed in the direction of the arrow and enlarged; Fig. 30, a broken view in end elevation of the mechanism at the right-hand side of the front of the machine, showing the relative position of the feed-guide to the step-mitering machine; Fig. 31, a view in the nature of a diagram of the automatic carrier feed and return governing mechanism; Fig. 32, an enlarged sectional elevation showing a detail of construction relating to the adjustment of a bed-rail; Fig. 33, a broken view, in sectional elevation, of the machine, showing two blanks respectively in position after delivery past and previous to delivery to the saws; Fig. 34, an edge view of a box-blank before its subjection to step-mitering; Fig. 35, a similar view of the same after it has been step-mitered; Fig. 36, an enlarged broken view showing a cluster of the cutting-saws and the relative position of a box-blank as it is fed thereto; Fig. 37, a broken view showing a cluster of chipping-disks and the relative position of a blank being fed thereto; and Fig. 38, an enlarged broken view of one corner portion of a box, showing how a step-mitered blank is bent to form the corner.

The frame of the machine comprises the two parallel sides A and A', provided with legs $A^2$ toward their opposite ends and with corresponding central upright cheeks $A^3$ and $A^4$ rigidly connected together across the machine by a bar $A^5$, bolted to their upper ends, and the sides are further reinforced by the cross-girders $A^6$ and $A^7$, extending between them respectively toward their opposite ends and provided in their upper sides with longitudinal slots $t\ t$ of inverted-T shape in cross-section and enlarged for the purpose of bolt-head insertion at their opposite ends.

In the inner sides of the cheeks $A^3$ $A^4$ are formed, to extend from their upper ends to rectangular openings $r$ in the centers of the respective frame sides, central vertical guide-grooves $q\ q$, and back of these openings in the sides A A' are similar openings $r'$.

B is a cross-head in the form of a plate having a flange $p$ extending forward along its upper edge, a ledge $p'$ extending backward from its lower edge, and a slot $t'$ of T shape in cross-section formed in its front side and enlarged at its opposite ends, and at the opposite ends of the plate B are legs B' B', provided along their outer sides with vertical ribs $p^2$, extending to the top of the plate and confined in the grooves $q$, Fig. 5. These legs terminate at their lower ends in shoes $B^2$ $B^2$, each provided on its outer side, respectively, near the heel portion and the toe portion with rectangular lugs $p^3\ p^4$, forming journal-bearings for the rotary saw-shafts, as hereinafter described, and surrounded by bosses $p^5$. These lugs extend into the openings $r$ and $r'$ in the frame sides, and the cross-head B is supported at them in a vertically-adjustable manner, hereinafter described. At intervals along the cross-head B are adjustably supported presser-feet $B^3$, carrying antifriction-rollers $v'$ in their bifurcated lower ends, the feet having upright shanks $v$, containing vertical slots $t^2$, through which pass bolts $v^2$, confined in the cross-head slot $t'$ and carrying nuts $v^3$, whereby on loosening a nut a presser-foot may be slid on its supporting-bolt in the slot to vary its position. Each presser-foot is set against vertical upward displacement by a set-screw device $v^4$, confined at its opposite ends between the flange $p$ and upper end of the shank $v$, and to render rigid and prevent tilting of the presser-foot from the level position its base should always occupy a head $v^5$ bears against it toward its rear end, the head being confined by a set-screw $v^6$, depending through the ledge $p'$.

C C are the longitudinal bed-rails, provided in desired number. (Five are employed in the machine, as illustrated.) A presser-foot is provided for each bed-rail, the construction of which is most clearly shown in Fig. 13. Each rail has extending throughout its entire length a T-socket $s$ in its upper side, Fig. 22, and involves an intermediate web portion having the enlargements $s'$ and $s^2$, affording perpendicular journal-bearings, and the transverse openings $s^3\ s^4$, adjacent to which, respectively, are the openings $s^5\ s^6$, having half-round concave outer ends, and the end portions of each rail are bifurcated and provided at their backwardly-inclined extremities with journal-bearings for the shafts of the sprocket-wheels of the chain-feed hereinafter described. In each rail C are also provided the vertical recesses $s^7\ s^8$, extending from the top of the rail and respectively coinciding with the enlargements $s'\ s^2$. These bed-rails are supported on the cross-girders $A^6\ A^7$, which pass through them at the openings $s^3\ s^4$, and are each adjustably fastened to its supporting-girder, as most clearly shown in Fig. 32, by bolts $w'$, confined in the girder-slots $t$ and passing through lateral flanges $w$ at opposite sides of each rail, where it intersects with a girder, the bolts being fastened by nuts $w^2$. When the nuts $w^2$ of a bed-rail are loosened, it may by sliding it be moved bodily with relation to an adjacent bed-rail, and screw-and-nut mechanism for so moving it is provided, as hereinafter described.

$D^2$ is the rotary shaft for the clusters of cutting-saws D, and $D^3$ is a similar shaft for the clusters of chipping-disks D'. The shaft $D^2$ is driven from a belt-pulley $D^4$ on one end, and the shaft $D^3$ is driven from a belt-pulley $D^5$ on the opposite end. These shafts extend transversely across the machine, being respectively journaled at their ends in the bearings afforded by the lugs $p^3\ p^4$ on the shoe ends of the cross-head legs B' and being also journaled between their ends at the recesses $s^7\ s^8$, provided in the bed-rails C, thus crossed by the saw-shafts. In the base of each bearing $p^3$ and $p^4$ there is confined at its squared head against rotation (as shown of the bearing $p^3$ in Fig. 29) a nut $o$, engaged by the threaded end of a stem $o'$, rotatably confined at its shoulder $o^2$ in a socket $o^3$, into which the nut enters, the socket being formed in the frame side. Underneath the socket is a collar $o^4$, fastened to the stem and carrying a sprocket $o^5$. The sprockets on the two stems $o'$ under the bearings $p^3$ and $p^4$ at each side of the machine are geared together by an endless chain $o^6$, and the stem $o'$ under each bearing $p^3$ carries on its lower end a miter $o^7$, meshing with a similar miter $o^8$ on a rotary shaft $o^9$, equipped with a hand-wheel $o^{10}$ on one end and journaled toward its opposite ends in bracket-arms $o^{11}$, supported from the bases of the frame sides A A'. The end of the shaft $o^9$ which projects beyond the frame side A carries a collar $o^{12}$ to confine the shaft against longitudinal movement, Fig. 6.

The shaft $o^9$ contains a longitudinal groove $x$ for keys, and it is supported at intervals between its end bearings in brackets $o^{13}$, fastened to depend from the sides of the bed-rails C. A miter $o^{88}$ abuts against the bearing portion of each bracket $o^{13}$ and is keyed on the shaft $o^9$. In each of sockets $s'$ $s^2$, forming enlargements in the web portion of each bed-rail C, is slidingly confined a nut $o^{99}$, Figs. 15, 17, and 20, terminating at its upper end in a ring $n$, these rings being located within the planes of the recesses $s^7$ $s^8$ in the bed-rails. The threaded end of a vertical stem $o^{33}$ enters each nut $o^{99}$ and is rotatably confined in the socket of that nut by a shoulder $o^{22}$, and the lower projecting end of each stem $o^{33}$ has fastened to it a collar $o^{44}$, carrying a sprocket $o^{55}$. On the lower end of the threaded stem in each socket $s'$ there is provided on the collar $o^{44}$ a miter $o^{77}$, meshing with an adjacent miter $o^{88}$ on the shaft $o^9$, and the sprockets $o^{55}$ on the stems $o^{33}$ of each pair of the sockets $s'$ $s^2$ are geared together by a chain $o^{66}$.

The cutting-saw shaft $D^2$, in addition to being journaled at $p^3$ $p^3$, passes through and finds bearing (though indirect, as will hereinafter appear) in one series of the rings $n$, extending across the machine in the recesses $s^7$, and the chipping-disk shaft $D^3$, in addition to being journaled at $p^4$ $p^4$, passes through and finds bearing in the same way in the other series of rings $n$ in the recesses $s^8$.

From the foregoing it will be apparent that by turning the shaft $o^9$ at the hand-wheel $o^{10}$ the following adjustments ensue: Depending on the direction of turning the shaft the four screw-stems $o'$ will be turned correspondingly to raise or lower the nuts $o$, and accordingly move the cross-head B up or down, and with it the presser-feet $B^3$ it carries and the cluster-shafts $D^2$ $D^3$, journaled in the bearings $p^3$ $p^4$, resting on the nuts $o$, and the gearing, with the shaft $o^9$ of the screw-stems $o^{33}$, carrying the two intermediate series of bearing-rings $n$, supporting the two cluster-shafts, causes turning of the shaft $o^9$ to move these rings correspondingly with the bearings $p^3 p^4$, whereby all the bearings for the two cluster-shafts are correspondingly adjusted by turning the shaft $o^9$ to adjust the cluster-shafts equally throughout. Obviously this adjustment does not affect the relations between the presser-feet and disk clusters, but only the distance between the bases of the presser-feet and bed of the machine afforded by the tops of the bed-rails C to raise the presser-feet for the accommodation below them on the bed of thicker blanks and lower them to contact with thinner blanks, the disk clusters being raised or lowered accordingly to cut and chip, respectively, higher or lower, as the case may be, for the thicker or thinner material to be step-mitered.

At intervals on the shaft $D^2$ are the clusters D of circular cutting-saws of the form most clearly shown in Figs. 15 and 16. Each of the clusters D between the end clusters (which are distinguished as $D^{11}$) consists, preferably, of eight saw-disks, the two outer ones $m$ being of the same diameter, the two next inner ones $m'$ being of slightly-greater diameter, the two next ones $m^2$ being of still greater diameter, and the two central ones $m^3 m^4$ being one of slightly-greater diameter than the other and each of greater diameter than the saws $m^2$. The saw clusters $D^{11}$ at the opposite ends of the shaft are shown to be composed of five of the disks $m$, $m'$, $m^2$, $m^3$, and $m^4$, with the disk of greatest diameter outermost in each case and of materially greater diameter than that of the largest disk of a cluster D for cutting through and trimming the opposite ends of the blank. The saw clusters $D$ $D^{11}$ produce the initial saw-cuts for step-mitering a blank E and engage the blank, as indicated most plainly in Fig. 36. The saw-disks of each cluster thereof are separated by interposed collars $m^5$, Fig. 15, which, with the disks, surround a sleeve $l$, keyed to the shaft $D^2$ in a manner to permit it to be slipped longitudinally thereon, but to rotate with it, and the cluster is confined between a rigid shoulder $l'$ on the sleeve between its ends and a washer $l^2$, secured by a nut $l^3$, a key $l^4$ serving to connect the saws and the collars $m^5$ rotatably with the sleeve. That portion of each sleeve $l$ at the other side of the rigid shoulder $l'$ from that carrying the saw-disks enters a ring $n$, confined between the rigid shoulder and a washer $l^5$, secured by a nut $l^6$.

On the shaft $D^3$, at intervals to coincide with the clusters D $D^{11}$, are the clusters $D'$ of chipping-disks, each consisting of seven toothed disks of the relative diameters illustrated in Figs. 17 and 18 to attack the blank, as indicated in Fig. 37, and chip out the wood between the cuts made by clusters D $D^{11}$ and produce step-miters E', as shown in Fig. 35. The chipping-disk clusters at the ends are distinguished as $D^{22}$, as they each involve only four disks. Each cluster $D'$ $D^{22}$ is fastened to the shaft $D^3$ to rotate with it, but permit of being slid for adjustment lengthwise thereof by means (shown in Fig. 17) like those employed for fastening the saw clusters—namely, a sleeve $l$, keyed to the shaft and in which the cluster is keyed and confined between a flange $l'$ and a washer $l^2$, secured by a nut $l^3$, the sleeve extending through the ring $n$, through which the shaft $D^3$ passes and being confined between the sleeve-flange $l'$ and a washer $l^5$, secured by a nut $l^6$.

Another adjustment is provided in the machine for the cutting and chipping clusters to bring them or certain of them closer together or separate them farther apart on their respective shafts, according to the relative positions in a blank in which the step-miters are to be produced for a square box or one longer in one direction or on one side than the other. The mechanism shown for effecting this adjustment involves the following construction: F F' are rotary shafts threaded throughout and journaled at their opposite ends, respectively adjacent to the inner sides of the girders $A^6 A^7$ in the frame sides. These shafts are stopped against longitudinal movement, as clearly shown in Fig. 5, and carry at their ends projecting beyond the frame side A miters $u$ and $u'$, respectively meshing with miters $u^2$ and $u^3$ on the opposite ends of a rotary shaft $u^4$, journaled in bearings $u^5 u^5$, extending from the outer side of the frame side A. The screw-shaft F carries on one end a handwheel $u^6$. In the openings $s^5 s^6$ of each bed-rail C, Fig. 11, are provided, respectively, the sliding half-nuts $s^{55}$ and $s^{66}$, each containing a half-round threaded recess $z$ in its end adjacent to the screw-shaft. Each of these nuts, the construction of which is shown clearest in Figs. 21 to 23, is flanged on one side to overlap the opening containing it at one side of the rail C and provided with a cap $z'$, fastened to its opposite side, there to overlap and thus confine the half-nut slidingly in place. Between each pair of the nuts $s^{55} s^{66}$ on one side of the web of each bed-rail C is fulcrumed, between its ends, a lever $k$, connected from one end by a link $k^2$ with the nut $s^{66}$ and from its opposite end by one arm of a bell-crank $k'$ with the nut $s^{55}$, the other arm of the bell-crank having connected with it one end of a rod or handle $k^3$, the free end of which is bent to a right angle, there to enter either of two holes $k^4$ or $k^5$, formed one in advance of the other in the side of the respective bed-rail near the front end of the machine, Fig. 3.

When the nuts $s^{55} s^{66}$ are out of engagement with the screw-shafts, turning them by turning the hand-wheel $u^6$ will not cause them to produce any action. When, however, it is desired to adjust any pair of clusters D D' with relation to another pair thereof on their shafts, the respective rod $k^3$ is drawn, after freeing its outer end from the opening $k^4$, to bring it coincident with the opening $k^5$, into which it is inserted to retain it. Thereby the lever $k$ is turned to move the nuts $s^{55} s^{66}$, through its connections with them, into mesh with the shafts F F', when turning them in one or the other direction at the hand-wheel $u^5$ moves the respective rail C (the nuts $w^2$ of which have been preparotarily loosened to be tightened again after the adjustment) accordingly along the girders $A^6 A^7$. The connection of the cluster-carrying sleeves $l$ with the rings $n$ and their rigid connection with the rail cause the described movement of the latter to move correspondingly with it the sleeves and the clusters thereon. Thus adjustment of the clusters D D' may be accomplished to a small fraction of an inch.

The mechanism for feeding across the clusters a blank to be step-mitered carries it slowly through the machine and then makes a quick return for another blank to be acted on. This mechanism, as shown, involves the following-described construction: Journaled at $j\,j$ in the opposite bifurcated ends of each bed-rail C and the ends of the frame sides A A' are longitudinally-grooved rotary shafts $G^2 G^3$, extending entirely across the machine and carrying at corresponding ends, respectively, the cog-wheels H and H'. In the opposite bifurcated ends of each bed-rail are keyed on the shafts $G^2 G^3$, to rotate with them, but to permit of their sliding thereon with the adjusting movement described of the bed-rail, sprocket-wheels G, connected by an endless chain G'. A portion of each chain passes through the base portion of the longitudinal socket $s$ of a bed-rail C and has fastened to it a rigid bar $G^4$, the shape of which in cross-section is shown in Figs. 6 and 24. This bar is provided in its upper expanded side with a central T-slot $t^3$, in which are confined by nuts $w^3$ screw-bolts $w^4$, having their heads countersunk in blocks $G^5$, which the bolts thus adjustably secure to the bar $G^4$. The chains G' on their sprocket-wheels, with the bars $G^4$ and blocks $G^5$, thus form a carrier for the blanks to be step-mitered, having its path on the bed-rails C and extending across the shafts $D^2 D^3$ and clusters thereon.

On stub-shafts I I' respectively journaled on the opposite ends of the frame side A are fastened pinions $I^2 I^3$, meshing with the gear-wheels H H' and belt-pulleys $I^4 I^5$, the latter having a straight-belt connection $I^{55}$ (represented in Fig. 1) with one drive-shaft $I^7$ for the feed or advance of the carrier, and the former having a cross-belt connection $I^{44}$ with another drive-shaft $I^6$ for the return of the carrier. The wheel H, by its gear connection with the drive-shaft $I^6$, is continually driven in one direction, but idly on its shaft $G^2$ until clutched thereto, as hereinafter described, and the wheel H', by its gear connection with the shaft $I^7$, is continuously driven in the same manner in the opposite direction. On the shaft $G^2$ is a clutch $i$ and on the shaft $G^3$ is a clutch $i'$, each clutch comprising a stationary member on the hub of a gear-wheel and a sliding member on the respective shaft carrying the gear-wheel, the clutch $i$ being at the outer side of the frame side A and the clutch $i'$ at the inner side thereof.

K is a rock-shaft journaled in suitable bearings near the base of the machine to extend lengthwise thereof and carrying at one end an arm $i^2$, engaging with the movable member of the clutch $i$, and K' is another rock-shaft similarly journaled and carrying on one end an arm $i^3$, engaging with the movable member of the clutch $i'$. On the two shafts K and K' are provided, coincident with each other, the upward-projecting arms $i^4$ $i^5$, Fig. 6, pivotally connected at their upper ends by a trip-bar L, extending across the base of the machine beyond the side A' thereof to the automatic clutch-actuating mechanism M, (illustrated in Fig. 31,) and which may be located in any convenient position relative to the step-mitering machine. This mechanism, as illustrated, comprises a constantly-rotating shaft $h$, carrying a crank-arm $h'$, provided with a thimble at its free end, a lever $h^2$, fulcrumed at $h^{22}$ at one end, pivotally connected between its ends with the trip-lever L, and carrying at its free end a thimble extending adjacent to that on the free end of the crank $h'$, and a bell-crank M', fulcrumed at its angle at $h^{33}$, with one arm $h^3$, pivotally connected between its ends to the adjacent end of the trip-bar, and its free thimble-equipped end extending in horizontal alinement with the free end of the lever $h^2$ across the path of the free end of the crank $h'$, and with the free thimble-equipped end of its other arm $h^4$ extending over the shaft $h$ in the plane between the lever $h^2$ and bell-crank arm $h^3$, adjacent to the path of the free end of the crank $h'$. The arrangement is such, as will be observed, that the clutches $i$ and $i'$ are engaged in contrary directions, and also, of course, similarly disengaged. With the parts of the mechanism M in the relative positions represented in Fig. 31 both clutches are disengaged, and the mechanism of the step-mitering machine is illustrated in the condition with this position of the parts of the clutch-actuating mechanism. Therefore in the rotation of the shaft $h$ in the direction indicated by the arrow in Fig. 31 the crank $h'$ engages the lever $h^2$, then extending into its path, turning it out of the path and at the same time drawing the arm $h^3$ farther into the path and accordingly turning the arm $h^4$ out of the path. This action shifts the bar L to rock the shafts K and K' in the same direction, thereby engaging the feed-clutch $i'$ and throwing the loose member of the return-clutch $i$ still farther out of engagement with its companion member, thus twice the distance therefrom that the free member of the clutch $i'$ was initially from its companion member. This clutch engagement produces rotation of the shaft I' to drive the shaft $G^3$, and thus turn all the sprockets G G in the direction to actuate the chains G' to advance a blank E, imposed on the blocks $G^5$, as hereinafter described, across and beyond the clusters D D'. By that time the shaft $h$ in its continued rotation through a half-revolution will encounter the arm $h^3$, extending into its path twice as far as the lever $h^2$ extended therein, and will throw it out, accordingly, twice the extent of the throw of that lever, thereby turning the bell-crank arm $h^4$ into the path of the crank $h'$ to the same extent as the lever $h^2$ is shown in the path, but shifting the trip-bar L twice as far as before and in the contrary direction, thereby moving the loose member of the return-clutch $i$ into engagement with its companion member and that of the feed-clutch $i'$ to the extreme end of disengagement with its companion member. This engaging of the clutch $i$ causes the rotation of the shaft I, more rapidly rotating than the shaft I', to be imparted to the shaft $G^2$ to reverse the travel of the chains G' and quickly return the blank-carrier to its initial position to receive another blank to be step-mitered. A quarter-revolution of the shaft $h$ will bring the carrier to that position when the crank $h'$ encounters the bell-crank arm $h^4$, throwing it out to the position in which it is illustrated in Fig. 31, thereby returning the arm $h^3$ and lever $h^2$ to their illustrated initial positions and as the result shifting the trip-bar L far enough to turn the shafts K K' sufficiently to disengage the loose members of both clutches $i$ $i'$ from their companion members, bringing them to their intermediate positions, and thus stopping the travel of the carrier until at the end of the last quarter-revolution of the shaft $h$ the crank $h'$ encounters the lever $h^2$ to repeat the operation described.

Connected with the trip-bar L to be actuated by its movements is mechanism for receiving a blank E to be fed to the machine on a plane above that of the carrier, then dropping it upon the carrier to bring it into position to be step-mitered by the mechanism therefor, and after the step-mitering operation lifting the finished blank above the plane of the blocks $G^5$ to permit the carrier to be returned, as heretofore described, to its initial position for receiving a fresh blank.

As shown, the mechanism referred to involves the following construction: Between the legs $A^2$ on opposite sides of the longitudinal center of the machine and on the base upon which the machine is supported are journaled in suitable standard-bearings $g$ the rock-shafts N and N'. On these shafts, Figs. 6 and 7, at the inner sides of a pair of the standards $g$ nearest the front end of the machine are fastened collars $g'$, carrying upwardly-projecting arms $g^2$, bifurcated at their extremities, there to embrace the trip-bar L, which seats in and is fastened to them. On the opposite ends of each rock-shaft N N' are fastened arms $g^3$, (shown in angular form,) each pair of which toward the front and rear ends of the machine is pivotally connected at its free end with and carries a bar $g^4$. At corresponding intervals along the bars $g^4$ there bear, with antifriction-rollers $f^2$ on their lower ends, vertical rods $f'$, passing upward through guide-bearings $f^3 f^4$, provided in suitable position on sides of bed-rails C, and coinciding rods $f'$ near opposite ends of the bed-rails are rigidly connected by bars $f$, extending alongside of such bed-rails.

When the clutch-actuating mechanism M throws the trip-bar L in the direction, as described, for engaging the feed-clutch $i'$, the connection of the trip-bar with the rock-shafts N N' turns them accordingly, and with them the arms $g^3$, to lower the bars $g^4$ below the planes at which they are shown in Fig. 6, thereby permitting the rods $f'$ to drop by gravity, and carry with them the bars $f$, considerably below the tops of the carrier-blocks $G^5$. The return throw of the trip-bar L for engaging the clutch $i$ rocks the shafts N N' in the opposite direction to turn the arms $g^3$ accordingly and raise the bars $g^4$, thereby raising the bars $f$ high above the carrier-blocks, and the throw of the bar L, which produces, as described, the disengagement of both clutches $i$ $i'$, brings the bars $g^4$ to the positions in which they are shown in Fig. 6, wherein the bars $f$ project slightly above the planes of the carrier-bars.

The operation is as follows: At the right-hand corner of the front of the machine is shown, Fig. 30, a guide-support T, leading transversely of the carrier in its initial position. From this guide-support the blanks E are fed to the machine automatically or by hand at proper intervals endwise, with their cleats $d$ undermost and wires $e$ uppermost. In sliding a blank from the support T upon the machine the free advance ends of the wires $e$ pass under and encounter a bar $e'$, extending across the support in their path, and are thus bent back to the condition shown out of the path of the saw clusters $D^{11}$ at the farther side of the machine, and the opposite or rear free ends of the wires $e$ as the blank is being fed to the saws, as hereinafter described, encounter a rigid deflector O, provided in their path on the machine, which bends the wire ends back out of the way of the saw clusters $D^{11}$ at the adjacent side of the machine. Thus the saws are prevented from encountering the wires, which would tend to dull them.

The outermost blocks $G^5$ present at their inner ends a transverse line of abutments $d'$ for the cleat $d$ at one side of the blank E, fed across them, and the blocks are so adjusted relatively to each other that the blank will fit over a number of them, with the cleat at one of its edges coinciding with the recesses between the outer end blocks and those next adjacent to them and with the cleat at the other edge of the blank coinciding with the alining recesses between two other adjacent rows of the blocks. In entering the machine the blank slides across and rests upon the series of bars $f$, then raised to receive it, as hereinbefore described, and shown in Fig. 6. The encounter which is timed to then ensue between the crank $h$ and lever $h^2$ of the mechanism M throws the trip-bar L to engage the feed-clutch $i'$ and effect lowering of the bars $f$, whereby the imposed blank is seated over the carrier-blocks, and the resultant rotation of the shaft $G^3$ produces travel of the chains $G'$ and bars $G^4$ and blocks $G^5$ thereon to carry the blank under the presser-feet $B^3$ across the clusters in its path under rotation on their shafts. The clusters $D^{11}$ trim the ends of the blank, and they, with the clusters D, make the cuts in the cleats and under sides of the sheet for the step-miters E', which are finished by the chipping action of the clusters $D^2$ $D^{22}$, which chip out the material between the side cuts to form the steps. On the arrival of the finished blank (then ready to be folded, as shown in Fig. 38, at the step-miter cuts to form the sides of a box) past the chipping-clusters the timing of the mechanism M produces encounter of the crank $h$ with the arm $h^3$, thereby throwing the trip-bar L accordingly to effect raising of the bars $f$ to lift the blank above the plane of the carrier-blocks $G^5$ and permit the latter to be returned to their initial position by the rotation in the proper direction for the purpose of the shaft $G^2$, produced by the throw of the trip-bar, causing engagement of the clutch $i$. Meantime the finished blank may be removed from the machine by any suitable means.

The timing of the mechanism M is such that when the carrier has been returned to its initial position the consequent engagement of the crank $h$ with the arm $h^4$ throws the trip-bar L to disengage both clutches $i$ $i'$, and thus stop the carrier and raise the bars $f$ to the position in which they are shown for receiving another blank E to be operated upon in the manner described.

The details of construction shown and described may of course be variously modified by those skilled in the art without departing from the spirit of the invention as defined by the claims.

What I claim as new, and desire to secure by Letters Patent, is—

1. In a step-mitering machine, the combination with the saw and chipping-disk clusters on their rotary shafts, of a reciprocatory carrier on the machine-bed, for the material to be step-mitered, a feed-clutch for engaging the carrier-driving gear to move the carrier toward said clusters, a return-clutch for engaging said gear to move the carrier in the opposite direction, a reciprocable trip-bar connected with the movable members of said clutches to actuate them, a support for said material connected with said trip-bar to be lowered and raised by its movements to deposit the material on and lift it off said carrier and driving means engaging said trip-bar to throw it alternately in opposite directions to actuate the clutches and support, substantially as described.

2. In a step-mitering machine, the combination with the saw and chipping-disk clusters on their rotary shafts, of a reciprocatory carrier on the machine-bed, for the material to be step-mitered, said carrier comprising block-equipped endless chains on sprockets secured to rotary shafts journaled toward opposite ends of the machine, a feed-clutch and gearing for connecting one of said sprocket-shafts with its driving power to move the carrier toward said clusters, a return-clutch and gearing for connecting the other sprocket-shaft with its driving power to move the carrier in the opposite direction, a reciprocable trip-bar connected with the movable members of said clutches to actuate them, and driving means engaging said trip-bar to throw it alternately in opposite directions to actuate the clutches, substantially as described.

3. In a step-mitering machine, the combination with the saw and chipping-disk clusters on their rotary shafts, of a reciprocatory carrier on the machine-bed, for the material to be step-mitered, a feed-clutch for engaging the carrier-driving gear to move the carrier toward said clusters, a return-clutch for engaging said gear to move the carrier in the opposite direction, a trip-bar connected with the movable members of said clutches, and driving means engaging said trip-bar to throw it in contrary directions for actuating said clutches, comprising a rotary drive-shaft carrying a crank-arm, a lever connected with said bar at one side of said drive-shaft, and a bell-crank having one arm connected with said bar at the opposite side of said drive-shaft, said lever and bell-crank arms extending to be engaged successively by the free end of said crank in traversing its path, substantially as described.

4. In a step-mitering machine, the combination with the saw and chipping-disk clusters on their rotary shafts, of a reciprocatory carrier on the machine-bed, for the material to be step-mitered, said carrier having endless chains on sprockets secured to rotary shafts journaled toward opposite ends of the machine, a feed-clutch on a rotary shaft geared with suitable driving power and with one of said sprocket-shafts, a return-clutch on a rotary shaft geared with suitable driving power and with the other sprocket-shaft, the sliding members of said clutches being movable in opposite directions to engage with their companion members, a trip-bar pivotally connected with arms on parallel rock-shafts carrying arms to engage said sliding clutch members, and driving means engaging said trip-bar to throw it alternately in opposite directions to actuate the clutches, substantially as described.

5. In a step-mitering machine, the combination with the saw and chipping-disk clusters on their rotary shafts, of a reciprocatory carrier on the machine-bed, for the material to be step-mitered, said carrier comprising block-equipped endless chains on sprockets secured to rotary shafts journaled toward opposite ends of the machine, a feed-clutch for engaging the carrier-driving gear to move the carrier toward said clusters, a return-clutch for engaging the carrier-driving gear to move the carrier in the opposite direction, a reciprocable trip-bar connected with the movable members of said clutches to actuate them, driving means engaging said trip-bar to throw it alternately in opposite directions to actuate the clutches, and bars supported adjacent to said chains to support said material, deposit it on and then lift it off said carrier, said bars being connected with said trip-bar to be raised and lowered by its movements, substantially as described.

6. In a step-mitering machine, the combination with the saw and chipping-disk clusters on their rotary shafts, a reciprocatory carrier on the machine-bed, for the material to be step-mitered, and its actuating-clutch devices, of a reciprocable trip-bar connected with the movable members of said clutch devices to actuate them, driving means engaging said trip-bar to actuate said clutches, and means for supporting said material preparatory to feeding it past said clusters, then depositing it and finally lifting it off said carrier, said means comprising rock-shafts extending crosswise of the base of the machine and connected with said trip-bar to be turned by its movements, bars supported on arms extending from said rock-shafts, vertical rods bearing at intervals on said bars to be raised and lowered with them, and bars connecting said rods in pairs and extending lengthwise of the machine, substantially as described.

7. In a step-mitering machine, the combination with a carrier for the material to be step-mitered, of the saw and chipping-disk clusters on rotary shafts geared together and journaled in vertically-adjustable bearings, a vertically-adjustable cross-head confined in the frame of the machine and carrying presser-feet depending over the machine-bed, and the end bearings for said shafts, screw-and-nut supports on the frame for said bearings and a rotary shaft geared with the screws of said supports to turn them in their nuts by turning the shaft to raise and lower said cluster-shafts and cross-head, substantially as and for the purpose set forth.

8. In a step-mitering machine, the combination with the frame supporting bed-rails at intervals and a carrier for the material to be step-mitered, of the saw and chipping-disk clusters on rotary shafts geared together and journaled in vertically-adjustable bearings, a vertically-adjustable cross-head confined in said frame and carrying pendent presser-feet and the end bearings for said shafts, intermediate bearings for said shafts supported on the bed-rails, screw-and-nut supports for said end and intermediate bearings, and a rotary shaft geared with the screws of said supports to turn them in their nuts by turning the shaft to raise and lower said cluster-shafts and cross-head, substantially as described.

9. In a step-mitering machine, the combination with the frame supporting bed-rails at intervals and having side cheeks, and a carrier for the material to be step-mitered, of a vertically-adjustable cross-head confined between said cheeks and carrying presser-feet, legs on the opposite ends of said cross-head terminating in shoes provided with journal-bearings and at which the cross-head is supported in the frame sides, saw and chipping-disk clusters on rotary shafts geared together and journaled in said bearings, screw-and-nut supports, for said bearings, bearings for said shafts on said bed-rails and having screw-and-nut supports, and a rotary shaft geared with the screws of said supports to turn them in their nuts by turning the shaft to raise and lower said cluster-shafts and cross-head, substantially as described.

10. In a step-mitering machine, the combination with the frame supporting the bed, a carrier for the material to be step-mitered and means in the path of said material for step-mitering it, of a cross-head supported on the frame over the bed, containing a longitudinal slot and provided with a flange along its upper forward edge and a backward-extending ledge, presser-feet carrying antifriction-rollers on their bases and provided with shanks at which they are adjustably bolted in said slot, and adjustable stops depending from said ledge to bear against the presser-feet, substantially as described.

11. In a step-mitering machine, the combination of the saw and chipping-disk clusters adjustable longitudinally of their rotary shafts, bed-rails adjustably supported on the cross-girders of the machine-frame and connected with said clusters, screw-shafts journaled in the frame to extend across said rails, nut-sections adjustably supported on a bed-rail adjacent to said screw-shafts and connected together to be moved by a single operation out of engagement with said screw-shafts or into engagement therewith to cause turning of the screw-shafts to move said rail and the clusters connected therewith, substantially as and for the purpose set forth.

12. In a step-mitering machine, the combination with the frame having cross-girders, of bed-rails bifurcated at their opposite ends and adjustably supported at intervals on said girders, sprocket-wheels journaled in the bifurcated ends of said rails and carrying endless block-equipped chains, saw and chipping-disk clusters secured on rotary parallel shafts to rotate with and be adjustable lengthwise of them, said shafts being journaled in the frame to extend across said rails, and supported thereon and said clusters being connected with their rail-supports for adjustment with the rails, screw-shafts journaled in the frame to extend across said rails, a pair of nut-sections adjustably supported on each bed-rail adjacent to the screw-shafts and a link-and-lever connection between the members of each pair of said nut-sections, having an operating-handle for actuating it, substantially as and for the purpose set forth.

FREDERICK P. ROSBACK.

In presence of—
M. J. FROST,
R. T. SPENCER.